United States Patent [19]

Limb et al.

[11] 3,890,462

[45] June 17, 1975

[54] SPEED AND DIRECTION INDICATOR FOR VIDEO SYSTEMS

[75] Inventors: John Ormond Limb, New Shrewsbury; John Arthur Murphy, Freehold Township, Monmouth County, both of N.J.

[73] Assignee: Bell Telephone Laboratories, Incorporated, Murray Hill, N.J.

[22] Filed: Apr. 17, 1974

[21] Appl. No.: 461,586

[52] U.S. Cl. ...... 178/6.8; 178/DIG. 1; 178/DIG. 20; 178/DIG. 21; 178/DIG. 33; 178/DIG. 36; 178/DIG. 38

[51] Int. Cl. .............................................. H04n 7/02

[58] Field of Search. 178/DIG. 20, DIG. 1, DIG. 21, 178/DIG. 33, DIG. 22, DIG. 36, 6.8, DIG. 38; 179/2 TV

[56] References Cited

UNITED STATES PATENTS 3,632,865 1/1972 Haskell et al. .......................... 178/6

*Primary Examiner*—Robert L. Griffin
*Assistant Examiner*—Marc E. Bookbinder
*Attorney, Agent, or Firm*—John F. Moran

[57] ABSTRACT

Apparatus is disclosed for measuring the speed and direction of subject movement between two video frames using only the video signal. Two selected differential signals are derived from the video signal. One of the differential signals is compared to a threshold to determine the presence of movement and the signs of the differential signals are compared to each other to find the direction of movement. Sums of each differential signal, in an area designated as moving, are accumulated over each video frame in accordance with the sign comparison between the two differential signals. At the end of each video frame, the sums are evaluated to ascertain the speed and to verify the direction of lateral movement. An embodiment of the invention uses this technique to measure only lateral subject movement. In another particularly advantageous embodiment, the same basic technique is extended to measure both horizontal and vertical movement. Individual signals indicative of horizontal and vertical movement are then combined to provide a resultant vectorial signal indicative of the complete subject movement that occurred.

9 Claims, 4 Drawing Figures

SPEED AND DIRECTION INDICATOR FOR VIDEO SYSTEMS

BACKGROUND OF THE INVENTION

This invention relates to television systems and more particularly to apparatus for deriving, from video signals, translation signals indicative of the speed and direction of subject movement between successive video frames.

Video surveillance and tracking systems and predictive video encoding transmission systems all require apparatus for deriving a translation, or velocity, signal indicative of the speed and direction of subject movement between video frames. The prior art apparatus for deriving this velocity signal, however, has heretofore necessitated rather complex and costly hardware. For example, in U.S. Pat. No. 3,632,865, issued to B. G. Haskell and J. O. Limb on Jan. 4, 1972, a predictive video encoding system utilizes a correlation technique to estimate subject translation. This technique requires multiple correlators, or comparators, and corresponding memory circuits for the correlators so that the group of correlators collectively compares a given point or picture element of the present video frame to all the picture elements of a previous video frame that defines a prescribed area large enough to include the subject movement, or displacement, which occurs between the two video frames. High capacity delay circuits of many taps are utilized so as to provide simultaneous access to the large number of picture elements in the prescribed area of the previous video frame. In this correlation technique, a selector indicates, at the end of the present video frame, which memory contains the largest sum so as to determine the amount of subject movement that has occurred. High accuracy correlation by the use of this technique also necessitates logic circuitry to prevent picture elements located in the peripheral regions of the present video frame from being compared to non-existent picture elements which nevertheless fall within the prescribed area. In other words, in order for the prescribed area to be completely contained in the previous video frame, it must be altered when dealing with the peripheral regions of the present video frame so as to exclude points that are geometrically located outside of the previous video frame.

SUMMARY OF THE INVENTION

It is, accordingly, a primary object of the present invention to provide a reliable and efficient arrangement for measuring the speed and direction of subject movement between video frames.

It is a related object of the invention to measure the speed and direction of subject movement based on a minimum number of comparisons of picture elements located in successive video frames.

A further object is to provide an arrangement which can be advantageously utilized in television systems used in manufacturing processes that employ automatons which are moving or which are in a moving environment.

The digital video output of an analog-to-digital converter is delivered, in accordance with the invention, to an arrangement of delay circuits and subtractors which provides first and second differential signals. The first differential signal is indicative of the intensity difference between each picture element of the present video frame and the corresponding picture element (i.e., one at a similar geometric location) of the previous video frame. The second differential signal represents a combination of the differences between similar proximate picture elements of the present and the previous video frames. That is, the difference between proximate picture elements of the present video frame are combined with the difference between the corresponding picture elements of the previous frame. Over each video frame, those magnitudes of the first and second differential signals which are indicative of movement between video frames are each sorted between separate pairs of accumulators on the basis of a sign comparison between these signals. Specifically, lateral subject movement to the right generally produces unlike signs in the two differential signals, while lateral left motion of the subject generally produces like signs in these differential signals. Accordingly, one set of accumulated magnitudes of each differential signal is stored which is indicative of movement to the lateral right and another set of accumulated magnitudes is stored for the signals which is indicative of lateral left motion. The larger of the two accumulations for the first or frame-to-frame difference signal indicates the direction of movement that occurred between the two video frames. Division of the net difference between the sums of the first differential signal by the sum total of the sums of the second differential signal produces a signal proportional to the speed of the subject movement. The direction and speed signals are then combined and converted into one signal indicative of the total lateral subject translation that occurred between the two video frames.

In accordance with a particularly advantageous embodiment of the invention, essentially the same circuitry is used to provide the two differential signals and the previously described signal processing is utilized to measure lateral or horizontal displacement. This embodiment, however, also includes additional circuitry which generates a line difference signal used in measuring vertical movement. This line difference signal is compared with the frame difference signal to develop a sign signal for sorting purposes. Then, utilizing the same general principles as previously described, the line difference signal and the frame difference signal are each respectively accumulated in a pair of accumulators for each video frame. Unlike signs between the differential signals are generally indicative of upward vertical movement, while downward vertical movement produces like signs in the two differential signals. The larger accumulated sum of the frame difference signal indicates the direction of movement. The difference between the accumulated sums of the frame difference signal is divided by the sum total of the accumulated sums of the line difference signal to determine the speed of movement in the vertical direction. Since both horizontal and vertical components of motion are now measured, total information as to subject movement is produced.

A particularly advantageous feature of the latter embodiment is its use in reducing redundant information in the video signal transmitted between private television subscriber sets such as in the Bell System's PICTUREPHONE system.

BRIEF DESCRIPTION OF THE DRAWING

These and other objects and features of the invention will be more readily appreciated and better understood by reference to the following detailed description which should be considered in conjunction with the accompanying drawings in which.

DETAILED DESCRIPTION

In some monitoring applications of television utilized in automatic processes, such as manufacturing perhaps, subject movement is confined to linear motion of a known orientation. Since the type of movement is predetermined, only the magnitude and sense, which is one of two opposite directions of the linear movement, are required to completely characterize the motion. In such cases, the television camera can be mounted so that the locus of subject motion corresponds to only lateral displacement in the video scene. This particular kind of application is only one of the many possible uses in which the apparatus of FIGS. 1A and 1B provides a convenient, yet efficient arrangement for determining the speed and direction of subject movement.

Figures 1A, 2:
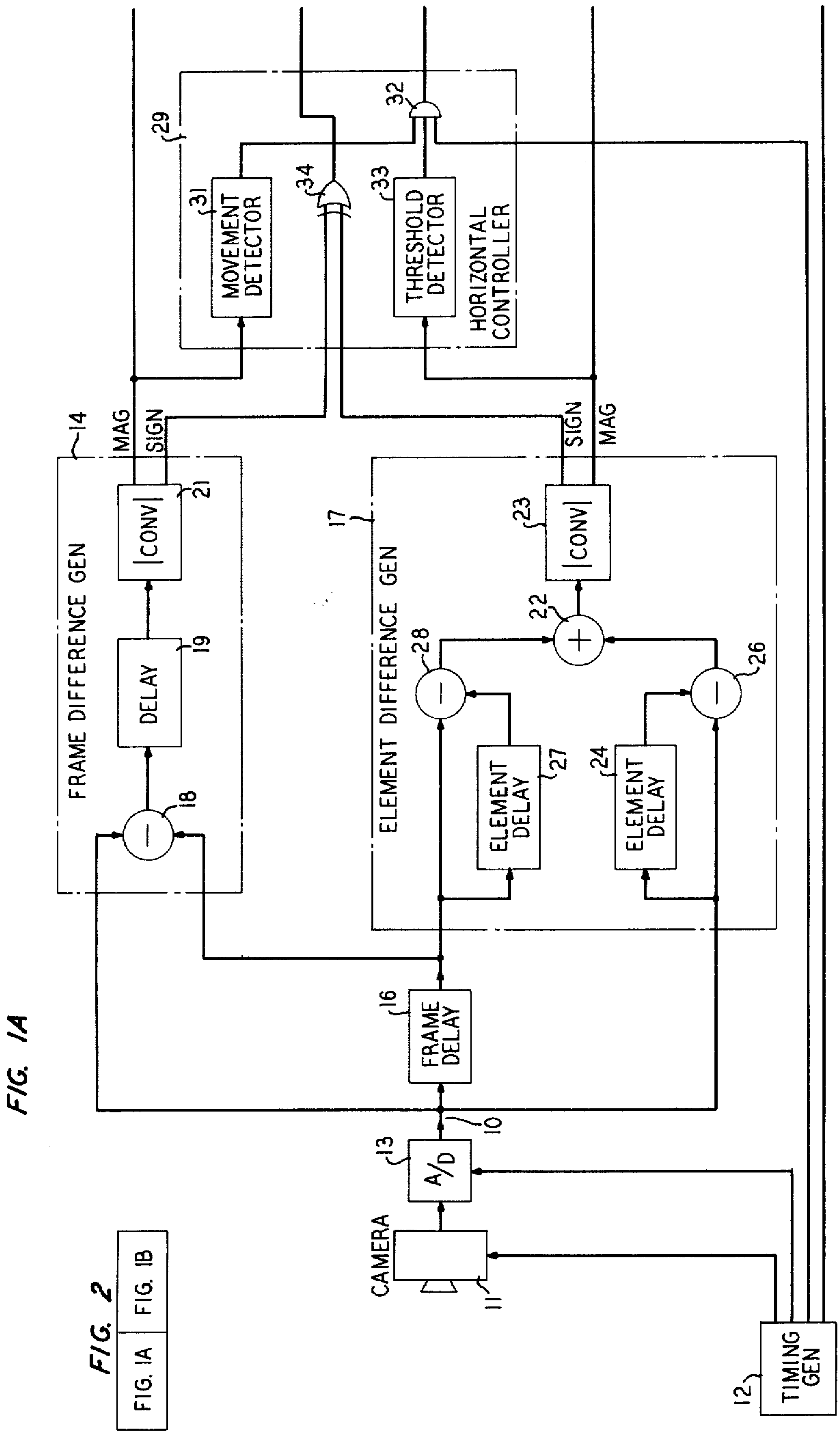
FIGS. 1A and 1B, when juxtapositioned as shown in FIG. 2, illustrate a schematic block diagram of apparatus constructed in accordance with the invention for measuring speed and direction of lateral subject movement.
Figure 1B:
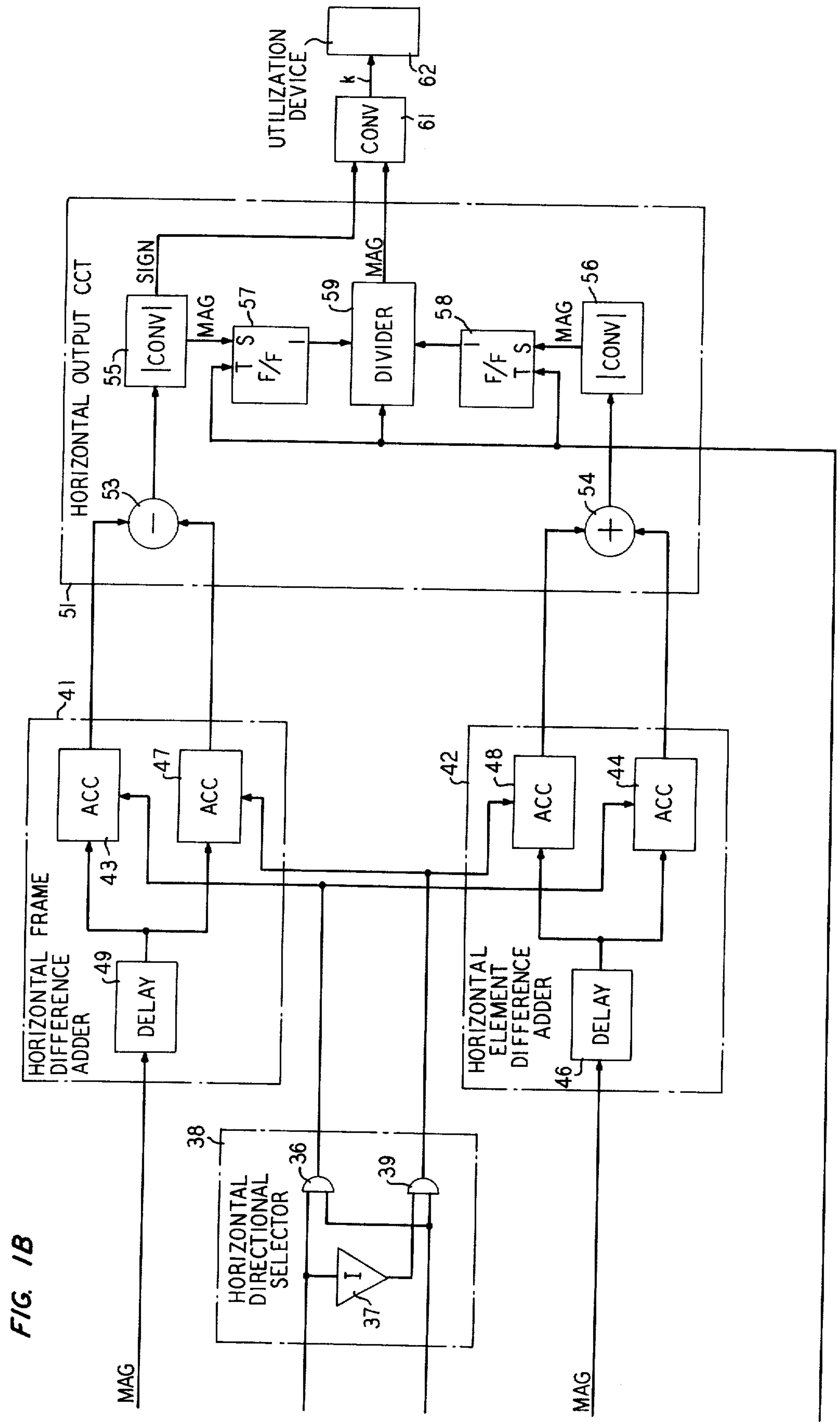

FIGS. 1A and 1B, which should be positioned as shown in FIG. 2, show a schematic block diagram which illustrates the principles of the invention in measuring the speed and direction of lateral subject motion between successive video frames. Cammera 11 is synchronized by timing generator 12 to provide a conventional analog video signal which is then converted into an n-bit PCM digital signal (e.g., $n$=8) by analog-to-digital converter 13. The converter 13 produces, in a conventional manner, successive sets of 8-bits, each of which froms a parallel 8-bit digital word that is applied to an output bus 10 comprised of 8 rail leads.

The digital video output of converter 13 is applied to frame difference generator 14, frame delay 16 and element difference generator 17. The delayed video digital output of frame delay 16 is also applied to difference generators 14 and 17. In this case, frame delay 16 has a storage capacity of a video frame so that as a digital word indicative of a presently generated picture element enters the delay, the corresponding picture element of the previous video frame indicative of a common geometric location emerges therefrom. In frame difference generator 14, subtractor 18 utilizes the input and output signals of frame delay 16 to produce a frame difference signal indicative of changes in intensity or brightness of each picture element in the present video frame with respect to the corresponding picture element of the previous video frame. This difference signal is delayed by delay 19 which serves to time the output of converter 21 so that it occurs simultaneously with the output of generator 17. Converter 21 provides two outputs, one is indicative of the magnitude of the difference signal and the other indicates the sign of the difference. In element difference generator 17, two differential signals are combined by adder 22 before application to absolute magnitude converter 23. One of the differential signals is derived from the current video signal by element delay 24 and subtractor 26. This differential signal is indicative of the difference between each newly generated picture element and a preceding picture element signal of the present video frame. In the same fashion, element delay 27 and subtractor 28 concurrently derive from the output of delay 16 the other differential signal which represents the difference between two picture elements of the previous video frame. The two picture elements of the respective frames that are selected for comparison in generator 17 may be successive picture elements adjacently located, two picture elements alternately adjacent to a common picture element, picture elements removed by more than one common picture element, etc. The respective capacities of delays 24 and 27, which in any case are equal to each other, may therefore be equal to the scan time that elapses between adjacently located picture elements, between alternately located picture elements, etc. Delay 19 may be omitted in the first case or have its capacity selected to provide simultaneity of the outputs of generators 14 and 17 for the other cases. Converter 23 receives the additive combination of these two differential signals from adder 22 and then provides separate magnitude and sign signals. It should now be apparent that generators 14 and 17 operate to produce a frame difference signal and an accompanying element difference signal for each presently produced picture element signal.

The pair of magnitude and sign signals from each of converters 21 and 23 are applied to horizontal controller 29. In controller 29, the magnitude signal from converter 21 is applied to movement detector 31. When the magnitude signal exceeds a predetermined threshold, detector 31 produces a logical "1" output pulse indicative of movement in the video signal which is applied to one input of three-variable AND gate 32. Similarly, threshold detector 33 produces a logical "1" output for AND gate 32 as a predetermined threshold is exceeded, but here this threshold only serves to eliminate signal variations due to noise from enabling gate 32. As a third input to gate 32, timing generator 12 provides a clock pulse that allows gate 32 to be enabled only once for each of the two differential signals which correspond to each of the currently generated picture element signals. Horizontal controller 29 also includes EXCLUSIVE-OR gate 34 which responds to the sign signals from converters 21 and 23 by producing a logical "1" output whenever the signs are different. One output of controller 29 therefore indicates which magnitude signals are indicative of motion while the other output signal indicates whether the accompanying sign signals are indicative of the same or different signs.

The output of gate 34 is applied to AND gate 36 and inverter 37, which are in horizontal directional selector 38. AND gate 39 receives the output of inverter 37. The other input signal for gates 36 and 39 is provided by gate 32. Gate 32 supplies a through path for clock pulses from timing generator 12 that correspond to the simultaneous occurrence of the two differential signals based on each picture element signal. Gate 36 only provides a logical "1" output upon the occurrence of a clock pulse from gate 32 when the two input signals applied thereto are indicative of motion and have opposite signs. Alternatively, when the two input signals to gate 39 indicate motion and have the same signs, gate 39 produces a clocked "1" output. For each picture element in a moving area, a clock "1" output is therefore produced by either gate 36 for lateral right motion or by gate 39 for lateral left motion.

Horizontal frame difference adder 41 receives the magnitude signal from converter 21 and the outputs of gates 36 and 39. The magnitude signal from converter 21 is momentarily detained by delay 49 so that its output coincides with a clock pulse from either gate 36 or gate 39. The clock pulse arrives at the input of gates 36 and 39 from timing generator 12 via gate 32. In other words, the delaying interval introduced by delay 49 compensates for the larger propagation delay experienced in evaluating the output signals of converters 21 and 23 which must occur in order to direct these signals to the proper accumulators in adders 41 and 42. Between accumulators 43 and 47, the accumulator that receives a corresponding clock pulse from selector 38 stores the output of delay 49. In the same manner, horizontal element difference adder 42 simultaneously receives the magnitude signal from converter 23 and the same clock pulses from selector 38. Delay 46 provides a function equivalent to that of delay 49 except for the output of converter 23. The magnitude signals applied to adder 42 which appear at output delay 46 are stored in either accumulator 44 or accumular 48, as determined by the clock pulse received from selector 38. Adder 41 stores the magnitude of the frame difference signal while adder 42 stores the magnitude of the element difference signal for all the picture elements in the moving area as determined by controller 29. Furthermore, these magnitude signals are each sorted between two accumulators in each of the adders on the basis of a comparison of the sign signals which accompany the magnitude signals.

Horizontal output circuit 51 receives the accumulated magnitude signals from adders 41 and 42 and proceeds to determine the speed and direction of subject movement. The sums stored in accumulators 43 and 47 are applied to subtractor 53 whose output indicates the difference between these sums. Converter 55 receives the output of subtractor 53 and produces accompanying magnitude and sign signals. Adder 54 adds the sum stored in accumulators 44 and 48 and applies the sum total to converter 56. Upon occurrence of a clock pulse from timing generator 12 at flip-flops 57 and 58, the respective magnitude signals of converters 55 and 56 are read into them. It should be understood that flip-flops 57 and 58 each represent a group of parallel devices, each of which stores one bit of a digital word. At the same time, the clock pulse starts divider 59 which proceeds to divide the magnitude signal of converter 57 by the output of converter 56. The result is a signal proportional to the magnitude of the horizontal speed of the subject movement. The other output of converter 55 indicates the direction of this movement. The two output signals are combined in converter 61 to provide a translation signal indicative of both the speed and direction of lateral movement. The translation signal is applied to a utilization device 62, which may control manufacturing processing.

In operation, the circuitry of FIGS. 1A and 1B derives speed and direction information relating to lateral subject movement in a television scene from the video signal. Frame difference generator 14 and element difference generator 17 each provide separate magnitude and sign signals for each picture element signal produced by camera 11. Horizontal controller 29 compares the magnitude of the frame difference signal to a threshold to determine which picture element signals have significant magnitude so as to be indicative of movement. A second threshold is used by controller 29 to eliminate noise from the element difference signal. When both thresholds are exceeded, gate 32 is partially enabled so that a clock pulse from timing generator 12 will pass through gate 32 onto horizontal directional selector 38. EXCLUSIVE-OR gate 34 of controller 29 compares the accompanying sign signals for the magnitude signals applied to the controller. Gate 34 issues a logical "1" output signal only when the sign signals from generators 14 and 17 are different. The output of gate 34 is applied to horizontal directional selector 38 with the clock pulses from gate 32.

Selector 38 then compares the input signals applied thereto to produce a "1" signal at the output of gate 36 or gate 39. If the lateral subject movement experienced by camera 11 is to the right, gate 34 produces a logical "1" output due to the difference in sign signals produced by generators 14 and 17. The output of gate 34 therefore prepares gate 36 for the clock pulse supplied by gate 32. Upon the occurrence of the clock pulse, gate 36 produces a logical "1" output. This signal is applied to accumulators 43 and 44 which are located respectively in adders 41 and 42. Accumulators 43 and 44, in response to the clock pulse, each store the magnitude signals applied thereto respectively by delays 49 and 46. Of course, it should be readily apparent that the clock pulse and the magnitude signals at the output of delays 49 and 46 are synchronized to each other. Accordingly, the actual occurrence of the clock pulse is based upon an evaluation of the same signals that are eventually stored by the accumulators when the clock pulse occurs. This accumulation process continues over each frame for all magnitude signals indicative of lateral right subject movement as determined by the accompanying sign signals.

If the lateral subject movement is to the left, the circuit operates in a slightly different manner. For lateral left movement, the sign signals produced by generators 14 and 17 are the same. Gate 32 supplies the clock pulse, but now gate 34, in response to the sameness of the sign input signals, produces a logical "0" output. It is now apparent that the inputs to gate 36 have different logical levels and, accordingly, inhibit that gate. Converter 37, in response to the "0" output of gate 34, applies a logical "1" level to gate 39. Gate 39 thus becomes enabled upon the occurrence of the clock pulse supplied by gate 32. The output of gate 39 is applied to accumulators 47 and 48 which respond by storing the respective magnitude signals that emerge from delays 49 and 46. For each video frame, accumulators 47 and 48 store all the magnitude signals produced by lateral left subject movement.

In horizontal output circuit 51, subtractor 53 and adder 54 each utilize the values stored for right movement and stored for left movement. While subtractor 53 provides the net difference between the accumulated values, adder 54 provides the sum total of same. The outputs of subtractor 53 and adder 54, which each include both magnitude and sign information, are respectively applied to converters 55 and 56. The sign signal from converter 55 indicates the direction of subject movement between video frames. At the end of each video frame, a clock pulse from timing generator 12 is applied to the toggle or clock inputs of flip-flops 57 and 58 and divider 59. Flip-flops 57 and 58, in response to the clock pulse, read and store the respective outputs of converters 55 and 56. Divider 59 begins dividing the stored value of flip-flop 57 by the stored value of flip-flop 58. Flip-flops 57 and 58 maintain their stored values until divider 59 produces an output signal indicative of the speed of subject movement. Converter 61 accepts the output of divider 59 and the sign signal from converter 55 and produces a horizontal translation signal indicative of subject movement for utilization device 62.

An additional characteristic in the operation of the circuitry of FIGS. 1A and 1B is that vertical subject movement does not affect the performance in measuring lateral subject movement. Vertical subject movement does generate frame difference signals, but the distribution of the signals which have like and different signs is equal. The effect of this equal distribution is that those portions of the accumulated values associated with vertical subject motion are equally distributed within the pair of accumulators in adder 41. Since those portions of the accumulated values due to vertical motion are equal and subtracted from each other in output circuit 51, the net difference is only indicative of lateral component of subject movement. It should therefore be evident that this operational characteristic enables the invention to measure the horizontal component of a subject which is moving diagonally in the television scene without any deleterious effect from the vertical component of the movement.

Figure 3:
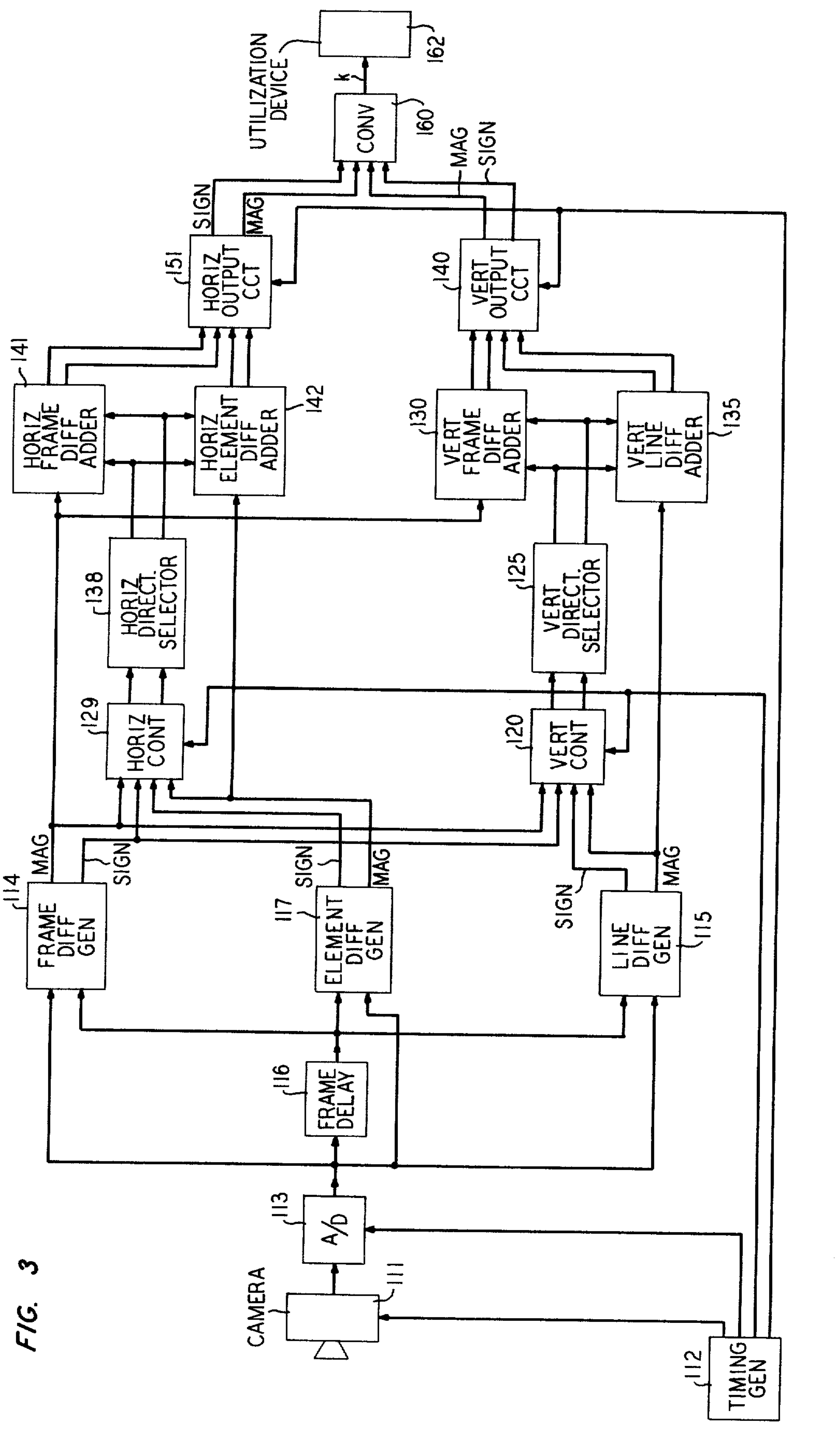
FIG. 3 is a block diagram of an illustrative embodiment according to the invention which measures speed and direction of subject movement for both horizontal and vertical motion in a television scene.

FIG. 3 is a general block diagram according to the invention for measuring total subject movement in a television scene from the video signal. Since the circuitry of FIG. 3 measures both lateral and vertical subject movement, the apparatus depicted in the upper portion of the figure has the same structure and performs the same function as the apparatus shown in FIGS. 1A and 1B. Those elements of FIG. 3 that are assigned reference numerals wherein the last two digits correspond to the reference numerals of respective elements of FIGS. 1A and 1B are essentially identical to the respective elements. Accordingly, the discussion of FIG. 3 will be mainly directed toward that portion of the apparatus therein which derives the speed and direction of vertical subject movement.

Among the additional circuitry of FIG. 3 is line difference generator 115 to which is applied the input and output signals of frame delay 116. Generator 115 has internal circuitry that is almost identical to that of element difference generator 17 of FIG. 1A, with the exception of one difference. The difference is that element delays 24 and 27 are replaced by line delays to obtain the line difference signal. This signal is indicative of the change in levels between corresponding picture element signals of adjacent video lines existing in the present and previous video frames. The line difference signal is then separated by a converter to form separate magnitude and sign signals. The magnitude and sign signals from generator 115 and generator 114 are applied to vertical controller 120. Vertical controller 120 is identical to horizontal controller 129, which is also the same as horizontal controller 29 of FIG. 1A. Vertical controller 120 produces two output signals, the first of which is a clock pulse, and the second is a signal which is derived by comparing sign information. Specifically, controller 120 compares the sign signals produced by the outputs of generator 114 and generator 115. If the signs are different, vertical controller 120 produces a second signal which indicates whether or not there is a vertical component of subject movement. Conversely, downward vertical movement of the subject produces like sign signals and the second output signal of vertical controller 120 changes level to indicate the downward motion. These two output signals of vertical controller 120 are applied to vertical directional selector 125 which like selector 138, supplies a clock pulse at one of its outputs for adders 130 and 135 for upward vertical movement. If the vertical movement is downward, selector 125 supplies the clock pulse at its other output which is connected to adders 130 and 135. In accordance with the output signals of selector 125, the magnitudes of the frame difference signal from generator 114 and the line difference signal from generator 115 are respectively accumulated and stored in adders 130 and 135. It is emphasized that adders 130 and 135, like adders 141 and 142, each internally contain a pair of accumulators between which the magnitude signals are sorted and stored. One stored sum is indicative of downward vertical motion while the other indicates upward vertical movement. The respective outputs of adders 130 and 135 are applied to vertical output circuit 140 which performs an equivalent operation for the vertical movement as does the horizontal output circuit 151 for lateral motion. At the end of each video frame, timing generator 112 issues a clock pulse to output circuits 151 and 140. At this time, both output circuits subtract the accumulated sums of the frame difference signals associated with opposite directions of movement from each other to find the speed and direction of the lateral and vertical movement that occurred between video frames. Output circuits 140 and 151, accordingly produce sign and magnitude signals which are applied to converter 160. Converter 160 combines the separate sign and magnitude signals for the horizontal and vertical components of the movement to form a resultant vectorial signal for utilization device 162.

In operation, the apparatus of FIG. 3 that derives the lateral speed and direction information for the video signal operates the same as the circuitry of FIGS. 1A and 1B. In a similar manner, the apparatus of FIG. 3 that derives the vertical speed and direction information operates simultaneously under the control of the same timing pulses from generator 112. At the end of each video frame, vertical output circuit 140 determines the speed and direction of vertical movement at the same time and using the same process as horizontal output circuit 151. It should be understood that the operational characteristic of the horizontal measuring apparatus which eliminates the effect of vertical motion also applies to the vertical measuring apparatus. The frame difference signals that are produced by horizontal movement in the vertical measuring apparatus which have like and different signs are equal. Accordingly, vertical output circuit 140 subtracts the accumulated sums indicative of opposite directions of movement from each other to determine the movement that occurred and thereby eliminates the effect of that portion in the accumulated sums attributed to horizontal movement. The magnitude and sign signals of both output circuits are then applied to converter 160 which combines the input signals to produce a resultant vectorial output signal $k$.

A typical example of utilization device 162 may be, for example, a predictive video encoding system. In the U.S. Pat. No. 3,632,865, issued to B. G. Haskell and J. O. Limb on Jan. 4, 1972, which was previously mentioned herein, a predictive video encoding system is disclosed which uses estimated subject velocity to reduce redundant video information. In such an application, the output of converter 160, which is a composite vectorial signal designated *k*, would be applied to control data switch 36 in FIG. 3 of the video encoding system. The value of k would correspond to a selected one of many translation vectors. The vector *k*, which is the translation information, is transmitted with differential updating and address information to the decoder shown in FIG. 5 of the patent. It is emphasized that this example of utilization device 162 is just one of many examples which may advantageously utilize the speed and direction signal produced by the invention.

Accordingly, it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. In combination, a signal source for supplying successive frames of a video signal including a representation of a moving subject;

first comparing means connected to said signal source for supplying first and second differential signals derived by comparing picture element signals, said first differential signal indicative of the intensity difference between each picture element signal of the present video frame and a corresponding picture element signal of a previous video frame, said second differential signal indicative of the combination of the intensity differences between each picture element signal of the present video frame compared to a preceding picture element signal of the present video frame and the corresponding picture element signal in the previous video frame compared to a preceding picture element signal in the previous video frame;

storing means for accumulating first sums of said first and second differential signals when subject movement between the present and previous video frames is in a first direction and second sums of said first and second differential signals when subject movement between the present and previous video frames is in a second direction opposite to said first direction;

evaluating means including second comparing means and first magnitude means, said second comparing means compares the first and second sums of said first differential signal to provide a directional signal indicative of the direction of movement, said first magnitude means providing a first magnitude signal proportional to the magnitude of said directional signal and also providing a second magnitude signal which is representative of an algebraic combination of at least the first and second sums of said second differential signal, said first magnitude means further comprising dividing means for providing a signal representative of a division of said first magnitude signal by said second magnitude signal to determine the speed of movement.

2. A combination according to claim 1 further including converting means coupled to said evaluating means for producing a combined translation signal indicative of the speed and direction of subject movement.

3. A combination according to claim 2 wherein said storing means comprises gating means for comparing the sign of said first differential signal to the sign of said second differential signal, said gating means producing a first level output indicative of said first and second differential signals having opposite signs to indicate motion in said first direction, and said gating means producing a second level output signal when said first and second differential signals have the same sign to indicate motion in said second direction whereby said first and second sums are accumulated from said first and second differential signals in accordance with the output of said gating means.

4. A combination according to claim 3 wherein said storing means further comprises first adding means connected to receive the magnitude of said first differential signal, second adding means conncected to receive the magnitude of said second differential signal, and separating means for comparing said first differential signal to a threshold to determine which of said first and second differential signals are indicative of motion, said separating means producing an output signal for said first and second adding means which respond by accumulating and storing sums of said first and second differential signals indicative of motion.

5. A combination according to claim 4 wherein said first adding means comprises first and second accumulating means and said second adding means comprises third and fourth accumulating means, said first and third accumulating means accumulating and storing the magnitudes of the differential signals applied thereto in response to a first level output signal from said gating means and the output signal from said separating means so as to provide said first sums indicative of subject movement in said first direction, and said second and fourth accumulating means accumulating and storing the magnitudes of the differential signals applied thereto in response to a second level output signal from said gating means and the output signal from said separating means so as to provide said second sums indicative of subject movement in said second direction.

6. A combination according to claim 5 wherein said storing means further comprises selecting means connected to receive the outputs of said gating means and said separating means and having a first output and a second output, said first output producing a predetermined signal level when said gating means produces the first level output and said separating means indicates said first and second differential signals are indicative of motion, and said second output producing another predetermined signal level when said gating means produces the second level output and said separating means indicates said first and second differential signals are indicative of motion whereby sums are accumulated of the magnitudes of said first differential signal indicative of opposite directions of motion and sums are accumulated of the magnitudes of said second differential signal indicative of opposite directions of motion.

7. A combination according to claim 6 including means for eliminating those portions of the accumulated sums of said first differential signal produced by subject motion in a direction perpendicular to said first direction between the present and previous video frames.

8. A combination according to claim 2 including generator means connected to said signal source for supplying a third differential signal indicative of the intensity difference between each current picture element signal compared to a corresponding picture element signal in a preceding video line, storing means for accumulating third sums of said first and third differential signals when movement between the present and previous video frames is in a third direction perpendicular to said first direction and fourth sums of said first and third differential signals when movement between the present and previous video frames is in a fourth direction opposite said third direction, further evaluating means including third comparing means and second magnitude means, said third comparing means compares the third and fourth sums of said first differential signal to provide an additional directional signal indicative of direction of movement in said third or fourth direction, said second magnitude means providing a third magnitude signal proportional to the magnitude of said additional directional signal and also providing a fourth magnitude signal which is representative of an algebraic combination of at least the third and fourth sums of said third differential signal, said second magnitude means further comprising dividing means for providing a signal representative of a division of said third magnitude signal by said fourth magnitude signal to determine the speed of movement in said third or fourth direction, and said converting means being further coupled to said further evaluating means so as to receive speed and direction indications of movement in said third or fourth direction to produce a translation vector signal indicative of the velocity of subject movement.

9. A combination according to claim 8 including means for eliminating those portions of the accumulated sums of said first differential signals associated with motion in said third or fourth directions motion which are produced by motion in said first or second directions between the present and previous video frames.

* * * * *